July 18, 1950 J. T. MEADE 2,515,883

MULTIPLE TELEPHONE STATION CALL INDICATOR AND
SELECTIVE ANSWERING SWITCH UNIT

Filed Dec. 18, 1948

INVENTOR
JOHN T. MEADE
BY Barnwell R. King
ATTORNEY

Patented July 18, 1950

2,515,883

UNITED STATES PATENT OFFICE 2,515,883

MULTIPLE TELEPHONE STATION CALL INDICATOR AND SELECTIVE ANSWERING SWITCH UNIT

John T. Meade, New York, N. Y.

Application December 18, 1948, Serial No. 66,072

4 Claims. (Cl. 179—1)

This invention relates to multiple telephone station cut-in switches and more particularly to station call indicating and selective answering or cut-in switch units.

In a suite of business offices in each of which there is a private telephone station, it is desirable to provide an answering telephone and cut-in switching means within reach of a secretary, so that when a telephone call comes in one office where the person called is out, the secretary can answer it through her telephone by switching into the called line. In the past this need has been taken care of by a manually operated double-throw switch for each one or each pair of telephone stations, and the resulting mechanism for a group of several stations is not only expensive to manufacture and install, but is cumbersome, difficult to move, and takes up considerable valuable office space. Furthermore, the switches must be reset after each use and the system is not private because operation of the other cut-in switches is possible while a conversation is taking place through any one station on the system. Other old systems involve complicated and expensive amplifier and relay circuits.

The main object of this invention, therefore, is to provide a multiple telephone station call indicator and selective cut-in answering switch unit that is compact, simple and economical in its parts, easy and inexpensive to manufacture and install, light in weight, and convenient to operate. Another object is to provide such a unit which does not require resetting of the switch after a call is answered, and also insures privacy against listening in on a conversation through a station other than the one called or the answering telephone.

According to the invention, there is provided a unit of the class set forth which comprises a small portable box containing a terminal strip mounted on the base and a rotary selector switch mounted on the front panel of the box. The panel has a plurality of ports, each of which corresponds to an individual telephone station, provided with a separate signal such as a lamp, arranged in a circle about a common center which substantially coincides with the axis of the rotary selector switch. A handle or knob for operating such switch is disposed at the front of the panel and has a pointer for indicating the station position of the switch corresponding to the signal lamp toward which the pointer points. The switch comprises a pair of switch gangs having corresponding stationary contacts, and rotary switch blades or contact arms in circuit relation with a telephone disposed within reach of the switch operator. A cable extending through a hole in the rear wall of the box, contains insulated conductors which connect each telephone station to a separate pair of terminals on the terminal strip. Such pairs of terminals are electrically connected by means of insulated wires within the box, in parallel circuit relation with the corresponding signal lamps and in parallel circuit relation with the corresponding stationary contacts of the switch gangs. Thus, when a call to a station is made the corresponding signal lamp lights due to energy supplied by the ringing current and, if the call is unanswered, the operator can take it through her telephone by merely turning the knob so that it points toward the illuminated signal lamp. The call is private insofar as the other stations of the systems are concerned and the switch does not need to be reset for future use. This is a great improvement over switches that have to be reset after a call is completed, since the resetting of switches is a nuisance and often neglected. Also, the operator has only to consider one switch handle—not a battery of them.

Figures 1, 2, 3:
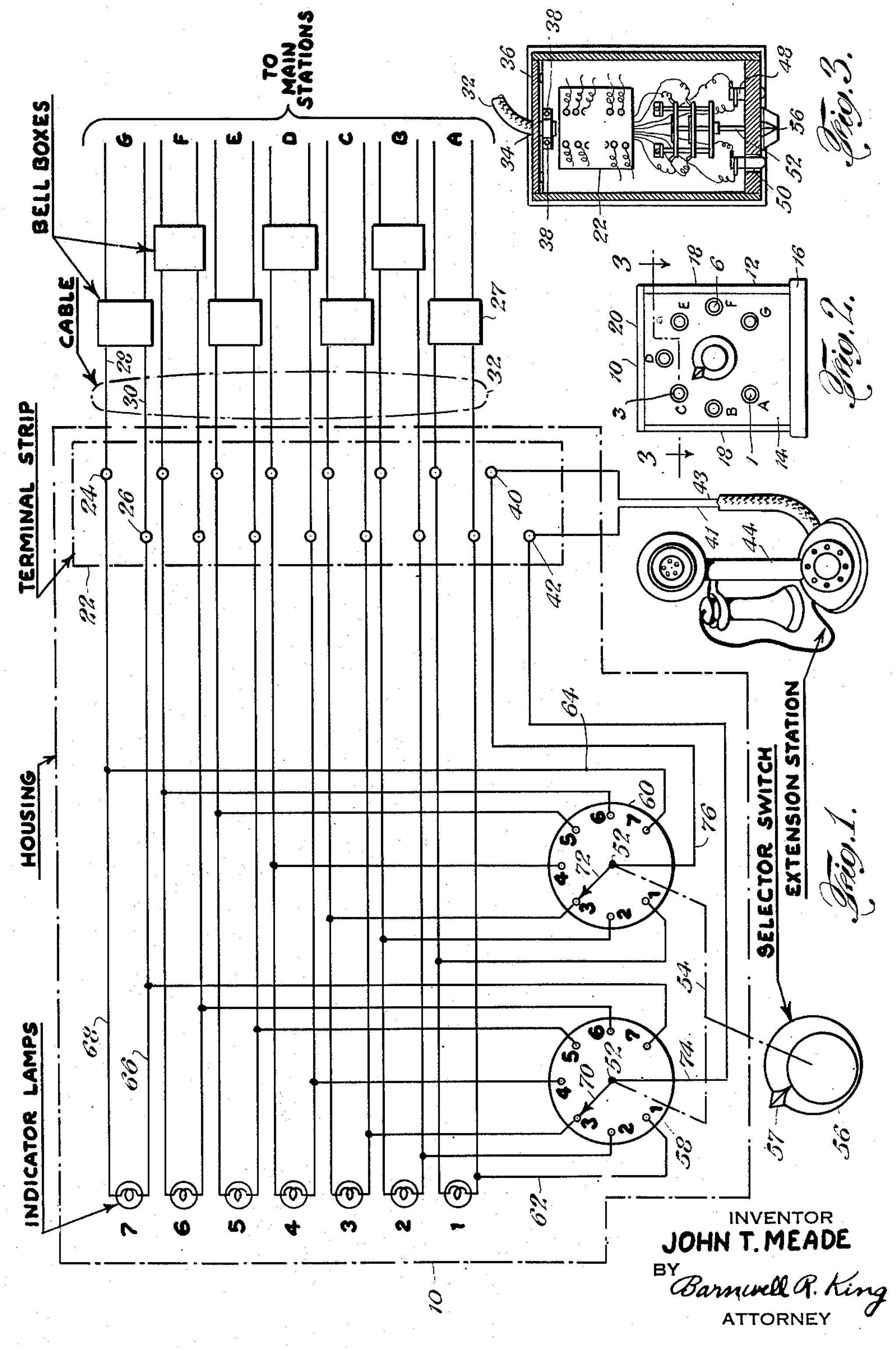
Fig. 1 is a circuit diagram of a unit illustrating the invention.
Fig. 2 is a view in front elevation of the unit.
Fig. 3 is a sectional view taken on line 3—3 of such unit.

As shown in the drawing, 10 is a multiple telephone station call indicator and selective answering switch unit embodying the invention. The unit 10 comprises a small box or housing 12 having a front panel 14 which is removably mounted in the frame provided by the base 16, side walls 18, and top 20 of the box. A terminal strip 22 is secured on the base 16 within the box. The strip 22 is provided with a pair of terminals 24 and 26 for each individual telephone station A—G. Such terminals are electrically connected to each individual telephone station of the system through individual bell boxes 27 by insulated conductors 28 and 30 contained in a common cable 32 which extends through a suitable hole 34 in the rear wall 36 of the box 12, the cable being anchored within the box by a hold-down clamp 38. The strip 22 is also provided with another pair of terminals 40 and 42 which are electrically connected by insulated wires 41 and 43, to a dial telephone 44 of an extension station within convenient reach of the box 12.

Mounted on the front panel 14 are a plurality of signal devices such as lamp sockets 48 in each of which is supported a signal lamp 1—7 corresponding to the stations A—G. The lamps are located in suitable ports 50 in the panel 14, the ports being arranged in a circle about a common center which substantially coincides with the axis of a shaft 52 of a rotary selector switch 54 which is manually adjustable by means of a single knob 56 secured to the shaft in front of the panel. The knob 56 is provided with a pointer 57.

The switch 54 includes two banks 58 and 60 of corresponding stationary contacts 1—7 which are connected by insulated wires 62 and 64 to insulated conductors 66 and 68, respectively, which connect the pairs of terminals 22 and 24 to the corresponding sockets 48 of lamps 1—7. The corresponding stationary contacts of the switch are adapted to be selectively engaged by a pair of corresponding rotary contact arms or blades 70 and 72 which are carried by the shaft 52 and are electrically connected in circuit relation with the extension telephone terminals 40 and 42 by means including insulated conductors 74 and 76. The switch 54 is of the type which is releasably held in adjusted position, and can be turned from one position to the next with a "snap" action.

In operation, when a call comes in telephone station C, for example, the ringing current causes the corresponding signal lamp 3 to light and if the party called is out, the operator at the extension station simply turns the selector switch knob 56 so that the pointer 57 thereon points toward such lamp. This electrically connects the extension telephone 44 in circuit with the called station C, as shown in Fig. 1 of the drawing, and enables the operator conveniently to take the incoming call for station C without leaving the extension station.

The unit 10 is easy to assemble, inexpensive, compact, light in weight, simple to operate, efficient, and requires no resetting of the single selector switch knob after a call has been answered. Except for the extension station operator, the conversations through the main telephone stations are private with respect to all of the others associated with the unit. The unit can also be used with any number of individual main telephone stations from one up to the total number of positions of the cut-in selector switch.

I claim:

1. A multiple telephone station call indicator and selective answering switch unit comprising a housing having a panel and containing a rotary selector switch having a single handle located in front of said panel, separate station call signal devices arranged on said panel in a circle about the axis of said switch, and circuit means for connecting contacts of the switch to separate individual telephone stations and also to an extension telephone station located within convenient reach of the unit, and means whereby an incoming call to an individual station is indicated by the corresponding one of said signal devices on said panel and means whereby such call can be answered through such extension telephone station by simply adjusting the rotary selector switch handle to the indicated signal device.

2. A combined telephone call indicator and cut-in switch unit comprising a portable housing provided with a panel having spaced signal devices arranged annularly about a common axis, there being a signal device corresponding to each telephone of several individual telephone stations, a rotary selector switch provided with a rotor the axis of which substantially coincides with the axis of said common axis, a single handle at the front of said panel for operating said rotor and including means indicating the position of the switch with respect to the signal devices, said switch comprising two banks of corresponding stationary contacts, means including insulated conductors for connecting corresponding pairs of said contacts and said signal devices across the circuits of several telephones, the rotor of said switch having a pair of contact arms selectively engageable with corresponding pairs of such stationary contacts, and circuit means for connecting said arms to another telephone within reach of the unit.

3. A call indicator and cut-in switch unit comprising signal devices, a rotary station selector switch provided with a stator having two banks of contacts, means connecting corresponding pairs of said contacts in parallel circuit relation with said signal devices, which rotor includes contact blades engageable with each of such corresponding pairs of contacts as the rotor is turned from one position to the next, means for connecting said blades electrically across an extension telephone set within reach of the unit, means for connecting each of said signal devices electrically across an individual telephone set, whereby a call to the latter is indicated by the corresponding signal device, and means whereby such call can be answered through the extension telephone set by simply adjusting the switch rotor so that the blades engage that pair of contacts corresponding to the indicated signal device which is connected to such individual telephone set.

4. A multiple telephone station call indicator and selective answering switch unit comprising a small portable box having a base, a front panel, and a rear wall, a multiple terminal strip mounted on such base and having a pair of terminals for each of a plurality of individual telephone stations, said rear wall having a hole through which is adapted to pass a cable containing pairs of insulated conductors connected to the telephones located at such stations and the corresponding terminals on said strip, and said front panel having a plurality of spaced ports arranged in a circle about a common center, there being a port corresponding to each of such pairs of terminals, a signal lamp mounted on said front panel in each port, means including pairs of insulated wires electrically connecting each pair of terminals with the corresponding signal lamp so that it lights when the corresponding telephone station is called, and a rotary selector switch mounted on said front wall for movement about an axis substantially coinciding with such center, said switch comprising a pair of switch gangs having corresponding stationary contacts, insulated electrical conductors connecting such contacts to said terminals, said switch also comprising a shaft rotatable on such axis, a pair of rotary contact blades in circuit relation with another pair of terminals on the strip which are connected to another telephone within reach of the box, said blades being fixed on said shaft and selectively engageable with corresponding stationary contacts, and a knob mounted on said shaft in front of the panel having a pointer adapted to point toward the signal lamp corresponding to the selected switch position, and means whereby when one of the telephone stations associated with the unit is called the corresponding signal lamp lights and if it is not answered the call can be privately answered by means of the other telephone within reach of the box, by simply turning the rotary selector switch knob manually so that the pointer thereon points toward the lighted lamp which indicates the telephone station being called, thereby switching the operator's telephone into the called telephone line.

JOHN T. MEADE.

REFERENCES CITED

The following references are of record in the file of this patent:

UNITED STATES PATENTS

| Number | Name | Date |
|---|---|---|
| 1,290,645 | Nelson | Jan. 7, 1919 |
| 1,903,972 | Bartley | Apr. 18, 1933 |
| 2,071,053 | Varley | Feb. 16, 1937 |
| 2,107,817 | Davis | Feb. 8, 1938 |